(12) United States Patent
ElSherbini et al.

(10) Patent No.: US 12,392,527 B2
(45) Date of Patent: *Aug. 19, 2025

(54) EJECTOR-ENHANCED HEAT RECOVERY REFRIGERATION SYSTEM

(71) Applicant: Carrier Corporation, Palm Beach Gardens, FL (US)

(72) Inventors: Abdelrahman I. ElSherbini, Windsor, CT (US); Parmesh Verma, Manlius, NY (US); Frederick J. Cogswell, Glastonbury, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/716,397

(22) Filed: Apr. 8, 2022

(65) Prior Publication Data

US 2022/0227198 A1    Jul. 21, 2022

Related U.S. Application Data

(63) Continuation of application No. 16/094,345, filed as application No. PCT/US2017/029326 on Apr. 25, 2017, now Pat. No. 11,300,327.

(Continued)

(51) Int. Cl.
*F25B 7/00* (2006.01)
*B60H 1/00* (2006.01)
(Continued)

(52) U.S. Cl.
CPC .................. *F25B 7/00* (2013.01); *F25B 1/06* (2013.01); *F25B 6/04* (2013.01); *F25B 27/02* (2013.01);

(Continued)

(58) Field of Classification Search
CPC ......................... B60H 2001/3298; F25B 7/00
See application file for complete search history.

(56) References Cited

U.S. PATENT DOCUMENTS 3,922,877 A    12/1975 Ophir et al.
4,164,850 A    8/1979 Lowi, Jr.
(Continued)

FOREIGN PATENT DOCUMENTS

CA    2671914 A1    1/2011
CN    201095301 Y    8/2008
(Continued)

OTHER PUBLICATIONS

MSDS for R134a.*
(Continued)

*Primary Examiner* — Christopher R Zerphey
(74) *Attorney, Agent, or Firm* — Bachman & LaPointe, P.C.

(57) ABSTRACT

A refrigerated transport system comprises: an engine. A vapor compression system comprises: a compressor for compressing a flow of a refrigerant; a first heat exchanger along a refrigerant flowpath of the refrigerant; and a second heat exchanger along the refrigerant flowpath of the refrigerant. A heat recovery system has: a first heat exchanger for transferring heat from the engine to a heat recovery fluid along a heat recovery flowpath; and a second heat exchanger along the heat recovery flowpath. The heat recovery system second heat exchanger and the vapor compression system first heat exchanger are respective portions of a shared tube/fin package.

19 Claims, 8 Drawing Sheets

Related U.S. Application Data

(60) Provisional application No. 62/331,313, filed on May 3, 2016.

(51) Int. Cl.
  *B60H 1/32* (2006.01)
  *F25B 1/06* (2006.01)
  *F25B 6/04* (2006.01)
  *F25B 27/02* (2006.01)
  *F25B 40/02* (2006.01)

(52) U.S. Cl.
  CPC .......... *F25B 40/02* (2013.01); *B60H 1/00014* (2013.01); *B60H 2001/3298* (2013.01); *Y02A 30/274* (2018.01)

(56) References Cited

U.S. PATENT DOCUMENTS

| | | | |
|---|---|---|---|
| 4,918,937 A | 4/1990 | Fineblum | |
| 5,117,648 A | 6/1992 | Kowalski et al. | |
| 5,462,113 A | 10/1995 | Wand | |
| 5,477,697 A | 12/1995 | Wharton et al. | |
| 5,509,272 A * | 4/1996 | Hyde | F25B 39/04 62/196.3 |
| 5,647,221 A | 7/1997 | Garris, Jr. | |
| 6,321,552 B1 | 11/2001 | Frederiksen | |
| 6,675,609 B2 | 1/2004 | Takeuchi et al. | |
| 7,703,296 B2 | 4/2010 | Jang et al. | |
| 8,628,025 B2 | 1/2014 | Bucknell | |
| 9,222,372 B2 | 12/2015 | Benson | |
| 9,657,977 B2 | 5/2017 | Hinde et al. | |
| 9,759,454 B2 | 9/2017 | Choi et al. | |
| 9,995,509 B2 | 6/2018 | Cline | |
| 10,047,991 B2 | 8/2018 | Kim et al. | |
| 10,094,577 B2 * | 10/2018 | Dennis | F24D 12/02 |
| 10,101,060 B2 * | 10/2018 | Feng | F25B 41/20 |
| 10,254,015 B2 * | 4/2019 | Punuru | F25B 5/02 |
| 11,300,327 B2 * | 4/2022 | Elsherbini | F25B 6/04 |
| 11,448,427 B2 * | 9/2022 | Liu | F25B 27/02 |
| 2004/0069012 A1 | 4/2004 | Inoue | |
| 2006/0266072 A1 | 11/2006 | Takeuchi et al. | |
| 2007/0101748 A1 | 5/2007 | Pham et al. | |
| 2010/0043475 A1 | 2/2010 | Taras et al. | |
| 2011/0030232 A1 | 2/2011 | May | |
| 2011/0162395 A1 | 7/2011 | Chakiachvili et al. | |
| 2011/0174015 A1 | 7/2011 | Nagano et al. | |
| 2011/0259039 A1 | 10/2011 | Ma et al. | |
| 2011/0289953 A1 | 12/2011 | Alston | |
| 2012/0111027 A1 | 5/2012 | Campbell et al. | |
| 2012/0116594 A1 | 5/2012 | Aidoun et al. | |
| 2014/0223933 A1 | 8/2014 | Steele et al. | |
| 2014/0260403 A1 | 9/2014 | Connell | |
| 2014/0345301 A1 | 11/2014 | Steele | |
| 2015/0052926 A1 | 2/2015 | Alston | |
| 2015/0321539 A1 | 11/2015 | Mohs et al. | |
| 2017/0182869 A1 | 6/2017 | Kujak et al. | |

FOREIGN PATENT DOCUMENTS

| | | |
|---|---|---|
| CN | 101688695 A | 3/2010 |
| CN | 101825372 A | 9/2010 |
| CN | 102062456 A | 5/2011 |
| CN | 203615641 U | 5/2014 |
| CN | 204165272 U | 2/2015 |
| CN | 105531130 A | 4/2016 |
| JP | 2002174493 A | 6/2002 |
| JP | 2007248022 A | 9/2007 |
| JP | 2007255768 A | 10/2007 |
| JP | 2011133123 A | 7/2011 |
| WO | 2010/129801 A1 | 11/2010 |
| WO | 2011/006251 A1 | 1/2011 |
| WO | 2015065643 A1 | 5/2015 |

OTHER PUBLICATIONS

Chinese Office Action dated May 30, 2023 for Chinese Patent Application No. 202111570274.0.
International Search Report and Written Opinion dated Jul. 14, 2017 for PCT Patent Application No. PCT/US2017/029326.
Chinese Office Action dated May 28, 2020 for Chinese Patent Application No. 201780027529.4.
Chinese Office Action dated Dec. 31, 2020 for Chinese Patent Application No. 201780027529.4.
US Office Action dated Jan. 13, 2021 for U.S. Appl. No. 16/094,345.
R. Tiruselvan et al., "Double Tube Heat Exchanger with Novel Enhancement: Part I—Flow Development Length and Adiabatic Friction Factor", 2012, pp. 641-651, Springer, New York, New York.
DOW®, Safety Data Sheet Dowfrost HD 40 Heat Transfer Fluid, Dyed, Apr. 23, 2015.
EXIM Trading LLC, Material Safety Data Sheet, R-245fa, Aug. 30, 2011.
US Office Action dated Jun. 9, 2021 for U.S. Appl. No. 16/094,345.
US Office Action dated Sep. 16, 2021 for U.S. Appl. No. 16/094,345.
Chinese Office Action dated Jan. 19, 2023 for Chinese Patent Application No. 202111570274.0.
Chinese Decision on Rejection dated Aug. 24, 2023 for Chinese Patent Application No.
European Office action dated Oct. 8, 2024 for European Patent Application No. 22164843.9.

* cited by examiner

EJECTOR-ENHANCED HEAT RECOVERY REFRIGERATION SYSTEM

CROSS-REFERENCE TO RELATED APPLICATIONS

This is a continuation of U.S. patent application Ser. No. 16/094,345, filed Oct. 17, 2018, entitled "Ejector-Enhanced Heat Recovery Refrigeration System", which is a 371 US national stage application of PCT/US17/29326, filed Apr. 25, 2017, which claims benefit of U.S. Patent Application No. 62/331,313, filed May 3, 2016, and entitled "Ejector-Enhanced Heat Recovery Refrigeration System, the disclosure of which applications are incorporated by reference herein in their entireties as if set forth at length.

BACKGROUND OF THE INVENTION

The invention relates to refrigeration. More particularly, the invention relates to heat recovery refrigeration systems such as refrigerated transport systems.

A transport refrigeration system used to control an enclosed area, such as the box of a truck, trailer, intermodal container, or the like, functions by absorbing heat from the enclosed area and releasing heat outside of the box into the environment. A number of transport refrigeration units, including units currently sold by assignee, employ a reciprocating compressor to pressurize refrigerant to enable the removal of heat from the box.

A number of systems power the vapor compression system via an internal combustion engine. Some systems directly couple the engine to the compressor to mechanically drive the compressor. Others electrically power the compressor via a generator. When an engine is present, a number of systems have been proposed to use heat recovery from the engine. Several recent systems include those of US Patent Application Publication No. 2012/0116594A1 of Aidoun et al., published May 10, 2012.

SUMMARY OF THE INVENTION

One aspect of the invention involves a refrigerated transport system comprising an engine. A vapor compression system comprises: a compressor for compressing a flow of a refrigerant; a first heat exchanger along a refrigerant flowpath of the refrigerant; and a second heat exchanger along the refrigerant flowpath of the refrigerant. A heat recovery system has: a first heat exchanger for transferring heat from the engine to a heat recovery fluid along a heat recovery flowpath; and a second heat exchanger along the heat recovery flowpath. The heat recovery system second heat exchanger and the vapor compression system first heat exchanger are respective portions of a shared tube/fin package.

In one or more embodiments of any of the foregoing embodiments, a separate subcooler has respective legs along the vapor compression flowpath and the heat recovery flowpath and the heat recovery system second heat exchanger is a condenser.

In one or more embodiments of any of the foregoing embodiments, there is no separate subcooler; and the heat recovery system second heat exchanger is an evaporator.

In one or more embodiments of any of the foregoing embodiments, the heat recovery system further comprises: an ejector having a motive flow inlet, a secondary flow inlet, and an outlet; a pump; and a loop of the heat recovery flowpath passing through the pump to the heat recovery system first heat exchanger, through the motive flow inlet and from the outlet back to the pump.

In one or more embodiments of any of the foregoing embodiments, the heat recovery system first heat exchanger has a leg along a coolant flowpath of the engine.

In one or more embodiments of any of the foregoing embodiments, the refrigerated transport system further comprises: an engine radiator; and a valve along the coolant flowpath for apportioning a total coolant flow between the radiator and the heat recovery system first heat exchanger.

In one or more embodiments of any of the foregoing embodiments, the engine is coupled to the compressor to drive the compressor.

In one or more embodiments of any of the foregoing embodiments, the engine is coupled to the compressor to mechanically drive the compressor.

In one or more embodiments of any of the foregoing embodiments, the engine is mechanically coupled to an electrical generator and the electrical generator is electrically coupled to an electric motor of the compressor.

In one or more embodiments of any of the foregoing embodiments, the refrigerated transport system further comprises a refrigerated compartment in thermal communication with the vapor compression system second heat exchanger.

In one or more embodiments of any of the foregoing embodiments, the refrigerated transport is a truck or a trailer.

In one or more embodiments of any of the foregoing embodiments, the engine, vapor compression system, and heat recovery system are mounted along a front of the compartment.

In one or more embodiments of any of the foregoing embodiments, the vapor compression system refrigerant and the heat recovery fluid are different from each other.

In one or more embodiments of any of the foregoing embodiments, the refrigerant is less flammable, less toxic, and/or less harmful to the contents of the refrigerated compartment than the heat recovery fluid.

In one or more embodiments of any of the foregoing embodiments, a method for operating the refrigerated transport system comprises, in a first mode: running the engine to drive the compressor to compress the flow of refrigerant and drive the refrigerant along the refrigerant flowpath; transferring the heat from the engine to the heat recovery fluid along the heat recovery flowpath; and rejecting heat from the refrigerant in the vapor compression system first heat exchanger.

In one or more embodiments of any of the foregoing embodiments, heat is absorbed by the heat recovery fluid in the heat recovery system second heat exchanger.

In one or more embodiments of any of the foregoing embodiments, in the first mode heat is rejected by the heat recovery fluid in the heat recovery system second heat exchanger.

In one or more embodiments of any of the foregoing embodiments, a separate subcooler has respective legs along the vapor compression flowpath and the heat recovery flowpath. The method further comprises, in the first mode transferring heat from the refrigerant in the vapor compression system t to the heat recovery fluid in the heat recovery system in the subcooler via a refrigerant-refrigerant heat exchange without airflow.

In one or more embodiments of any of the foregoing embodiments, the refrigerated transport system further comprises a radiator and the method further comprises, in the first mode using a valve to apportion engine coolant between the heat recovery system first heat exchanger and the radiator.

Another aspect of the invention involves a combined cooling heating and power (CCHP) system comprising: a heat source. A vapor compression system comprises: a compressor for compressing a flow of a refrigerant; a first heat exchanger along a refrigerant flowpath of the refrigerant; and a second heat exchanger along the refrigerant flowpath of the refrigerant. A heat recovery system has: a first heat exchanger for transferring heat from the heat source to a heat recovery fluid along a heat recovery flowpath; and a second heat exchanger along the heat recovery flowpath. The heat recovery system second heat exchanger and the vapor compression system first heat exchanger are respective portions of a shared heat exchanger for rejecting heat to a heat transfer fluid. Further embodiments may variations be along the lines of the other embodiments discussed above and below.

In one or more embodiments of any of the foregoing embodiments, the heat source comprises an engine and an electric generator is mechanically coupled to the engine to be driven by the engine.

In one or more embodiments of any of the foregoing embodiments, the shared heat exchanger is a water-cooled condenser (WCC).

In one or more embodiments of any of the foregoing embodiments, the water-cooled condenser is selected from the group consisting of: a shell and tube WCC; tube-in-tube water WCC; and a brazed plate WCC.

Another aspect of the invention involves a system comprising a heat source. A vapor compression system comprises: a compressor for compressing a flow of a refrigerant; a first heat exchanger along a refrigerant flowpath of the refrigerant; and a second heat exchanger along the refrigerant flowpath of the refrigerant. A heat recovery system has: a first heat exchanger for transferring heat from the heat source to a heat recovery fluid along a heat recovery flowpath; and a second heat exchanger along the heat recovery flowpath. The heat recovery system second heat exchanger and the vapor compression system first heat exchanger are respective portions of a shared heat exchanger for rejecting heat to a heat transfer fluid and/or are in common (e.g., series or parallel) along a heat transfer fluid flowpath. Further embodiments may variations be along the lines of the other embodiments discussed above and below.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 2:
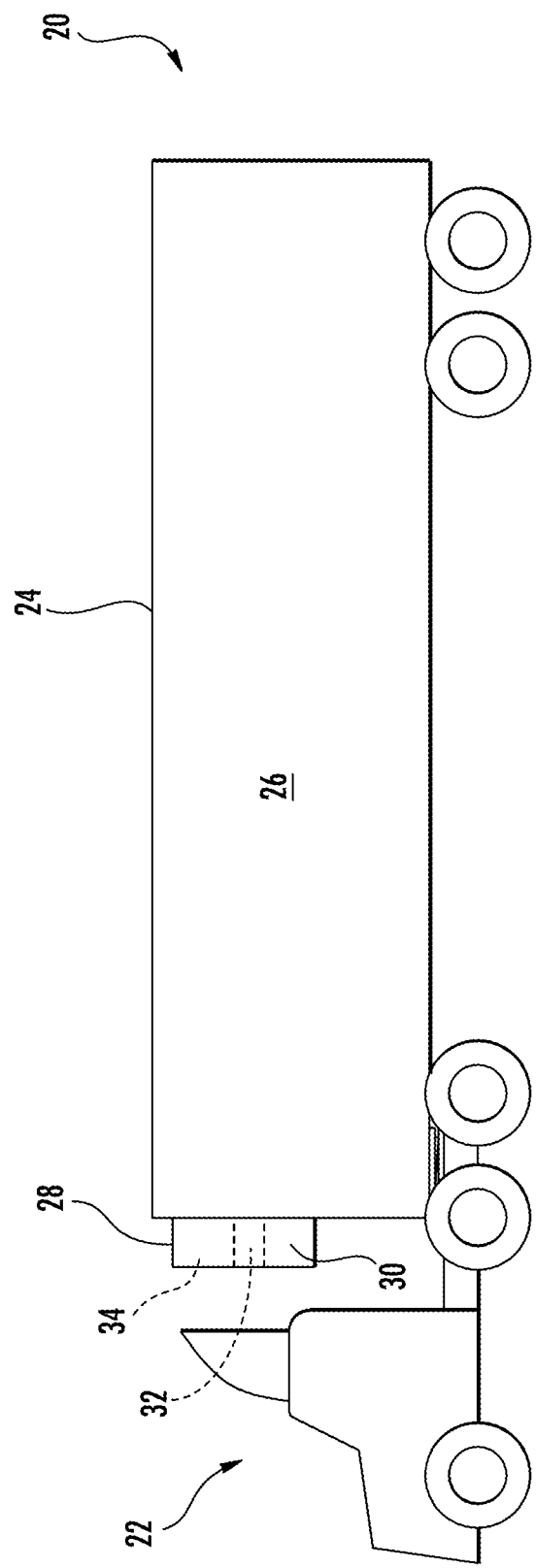
FIG. 2 is a schematic view of the refrigerated transport system.

FIG. 2 shows a refrigerated transport unit (system) 20 in the form of a refrigerated trailer. The trailer may be pulled by a tractor 22. The exemplary trailer includes a container/box 24 defining an interior/compartment 26. An equipment housing 28 mounted to a front of the box 24 may contain an electric generator system including an engine 30 (e.g., diesel) and an electric generator 32 mechanically coupled to the engine to be driven thereby. A refrigeration system 34 may be electrically coupled to the generator 32 to receive electrical power.

Figure 1:
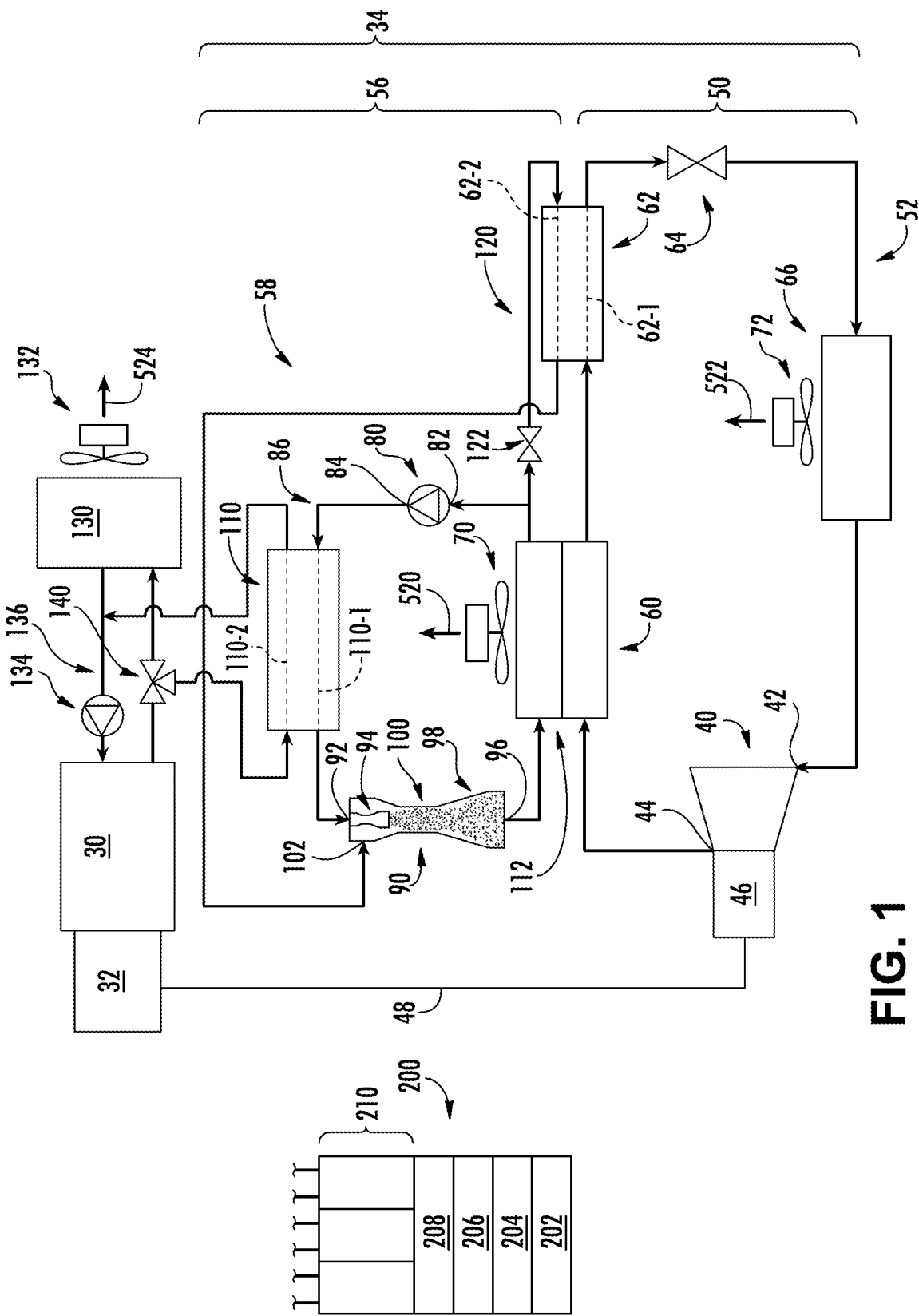
FIG. 1 is a schematic view of a refrigeration system of a refrigerated transport system.

FIG. 1 shows further details of the exemplary refrigeration system 34. The system 34 includes a control system 200. The control system 200 may include: one or more user interface (e.g., input/output) devices 202; processors 204; memory 206; storage 208; and hardware interface devices 210 (e.g., ports).

The system 34 further includes a compressor 40 having a suction (inlet) port 42 and a discharge (outlet) port 44. An exemplary compressor 40 is an electrically-powered reciprocating compressor having an integral electric motor 46. The compressor 40 may be coupled to the control system 200 to regulate its operation and to the generator 32 via power lines 48 to receive power. The compressor is a portion of a vapor compression system 50 having a recirculating refrigerant flowpath or loop 52. The exemplary refrigeration system 34 further comprises a heat recovery system 56 having a heat recovery flowpath or loop 58.

Along the refrigerant flowpath 52, the vapor compression system 50 includes, in a downstream direction from the discharge port or outlet 44, a heat exchanger 60, a leg 62-1 of a subcooler 62, an expansion device 64, and a heat exchanger 66 before returning to the suction port 42. In a normal operational mode, the heat exchanger 60 is a heat rejection heat exchanger (condenser or gas cooler) and the heat exchanger 66 is a heat absorption heat exchanger (evaporator). Both heat exchangers 60 and 66 may be refrigerant-air heat exchangers having respective fans 70 and 72 driving airflows 520 and 522 along air flowpaths across the heat exchangers. The heat exchanger 66 is in thermal communication with the box interior to cool the box in the normal cooling mode(s). The heat exchanger 60 is in thermal communication with an exterior of the box to reject heat to the airflow 520 in the normal cooling mode. Thus, the airflow 520 may be an external airflow and the airflow 522 may be an interior airflow.

As is discussed further below, the subcooler 62 is a refrigerant-refrigerant heat exchanger wherein the leg 62-1 along the refrigerant flowpath 52 is in heat exchanger relation with a leg 62-2 along the heat recovery flowpath 58. The heat recovery fluid flowing along the heat recovery flowpath may go through a phase change (e.g., as discussed below) and may otherwise be characterized as a refrigerant. However, for convenience of reference, it will be hereafter referred to as the heat recovery fluid. The heat recovery fluid and the refrigerant may, in some implementations, have identical compositions or may be different. In the latter situation, there will be no fluid communication between the two loops. In the former, there could be.

The heat recovery system 56 includes a pump 80 having an inlet 82 and an outlet 84. The pump is along a sub-loop or flowpath branch 86 of the heat recovery flowpath 58 which also includes the primary flowpath of an ejector 90.

The branch 86 may also provide a convenient location for a receiver (not shown; e.g., at the pump inlet). The ejector has a primary or motive flow inlet 92 at the inlet of a nozzle (e.g., a convergent-divergent nozzle) 94 and an outlet 96 at the downstream end of a diffuser 98. The ejector further comprises a mixer 100 and a secondary or suction inlet port 102. Sequentially along the loop 86 proceeding downstream from the pump 80 in a normal operational mode, flow passes through a leg 110-1 of a heat exchanger 110, the ejector primary inlet 92, the ejector outlet 96, and a heat exchanger 112 before returning to the pump.

A second sub-loop or flowpath branch 120 branches off from the loop 86 between the heat exchanger 112 and pump 80 and passes sequentially through an expansion device 122, the heat recovery loop leg 62-2 of the subcooler 62, and returns to the ejector secondary or suction port 102. In normal heat recovery operation, the heat exchanger 110 is a generator heat exchanger transferring heat from the engine in a leg 110-2 to the leg 110-1 of the heat recovery loop. Similarly, the heat exchanger 112 is a heat rejection heat exchanger. The heat recovery loop leg 62-2 of the subcooler serves as an evaporator or heat absorption heat exchanger absorbing heat from the vapor compression system leg 62-1 of the subcooler.

FIG. 1 further shows, associated with the engine 30, a radiator 130 and a fan 132 (electric or mechanical) driving an airflow 524 across the radiator. For engine cooling, a coolant pump 134 (e.g., mechanical or electric) may drive fluid along a recirculating loop 136 outputting heated coolant from the engine and returning reduced temperature coolant. The coolant may be a conventional engine coolant such as a water and glycol mixture. In the exemplary implementation, a valve 140 allows selective communication of the coolant flow to the heat exchanger 110 and/or the radiator 130. In this example, the valve 140 is a proportioning valve allowing a stepwise or continuous allocation of the coolant flow between the heat exchanger 110 and the radiator 130. In alternative embodiments, the valve is bi-static. For example, one configuration of a bi-static valve may alternatively deliver coolant to the heat exchanger 110 or radiator while not delivering to the other. Yet other bi-static situations involve having flow to both in at least one condition.

In the exemplary implementation, the heat exchangers 60 and 112 are part of a single heat exchanger unit. In an exemplary implementation, the unit is a single bank of tubes and fins with the heat exchangers 60 and 112 representing separate groups of legs of the tubes but sharing fins and tube plates. In the exemplary illustrated implementation, the two heat exchangers 60 and 112 are in series along an air flowpath for the airflow 520. In the exemplary embodiment in the normal cooling mode, the heat exchanger 112 is downstream of the heat exchanger 60 along the associated air flowpath. The integrated heat exchanger with series airflow may have advantages in terms of economizing on space, economizing on heat exchanger cost, and economizing on fan cost (e.g., by having a single fan servicing both). By having the heat exchanger 60 upstream along the air flowpath, it receives the coldest air in normal operation.

A number of variations are possible. Plural of these variations may coexist. One group of variations involves having the compressor 40 mechanically powered by the engine 30 (e.g., directly driven or driven via a transmission) rather than electrically driven. This would eliminate the motor 46 and eliminate the generator 32 (although the engine may include a generator for powering the engine (e.g., providing spark, starting, and the like)).

Figure 3:
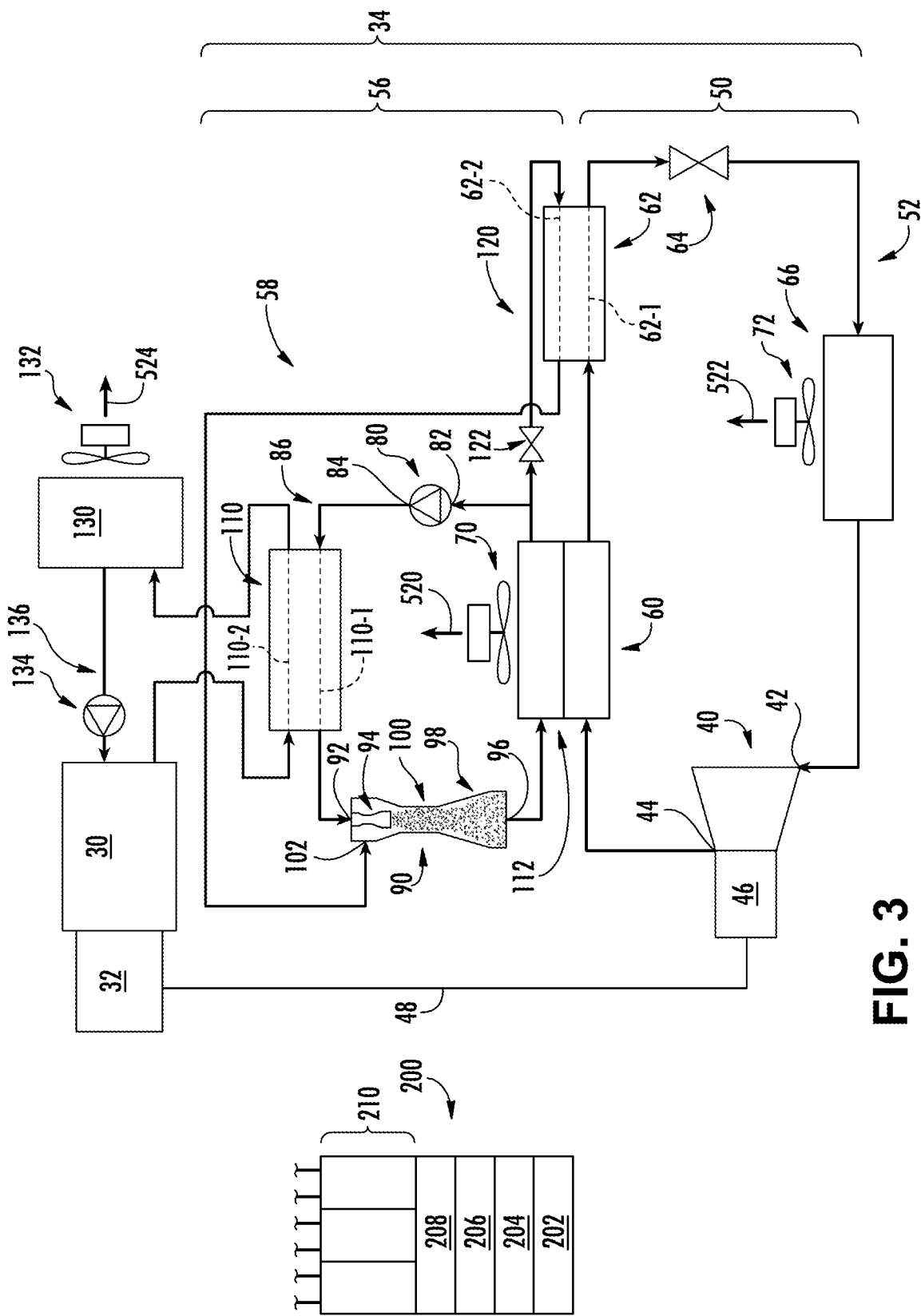
FIG. 3 is a schematic view of a second refrigeration system.

In other variations, the valve 140 may be eliminated so that all coolant passes in series through the heat exchanger 110 and the radiator 130 (e.g., FIG. 3).

Other variations involve eliminating the radiator 130 (and its fan 132) so that the coolant supply and return pass directly between the engine and the heat exchanger 110. The radiator elimination may reduce cost and space consumed. The heat recovery loop takes heat from the engine coolant and the subcooler 62 and rejects it to air at the heat exchanger 112. In order to protect the engine, the operation of this variation could be prioritized for engine heat rejection. For example this may involve running with the vapor compression system in a less-efficient state so as to consume more power (and thus require the engine to consume more fuel) than if the engine were rejecting heat via the omitted radiator.

Other variations involve altering the cycles of the vapor compression system 50 and/or the heat recovery system 56. The exemplary illustrated systems are relatively simple and many additional features could be added as are known in the art or yet developed. These, for example, include the use of economized vapor compression systems or ejector cycles in the vapor compression system.

Further variations involve using engine exhaust heat in addition to or as an alternative to engine coolant for transferring heat to the heat recovery system in the heat exchanger 110. These variations can increase the amount of heat and the temperature at heat exchanger 110, leading to increased capacity and efficiency of the heat recovery loop.

Yet further variations involve adding a feature such as a de-superheater linking the two loops in addition to the subcooler 62. An exemplary de-superheater is a refrigerant-refrigerant heat exchanger having a leg along the vapor compression system upstream of the heat exchanger 60 and a leg along the heat recovery flowpath downstream of the subcooler. This may decrease the compressor work and increase the system efficiency.

Figure 4:
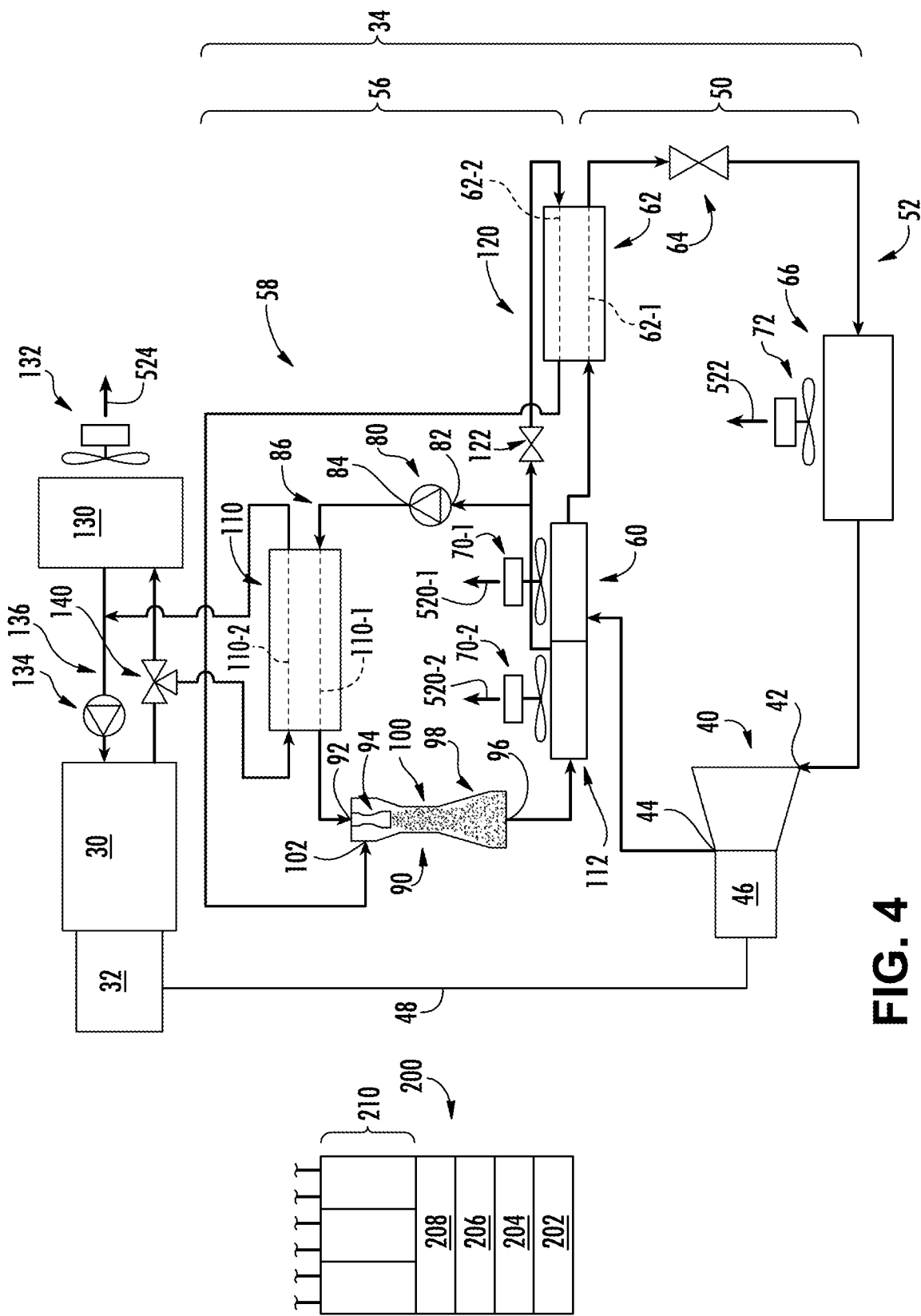
FIG. 4 is a schematic view of a third refrigeration system.

Yet further variations involve placing the heat exchangers 60 and 112 in parallel (e.g., FIG. 4) along air flowpaths rather than in series while still maintaining them as part of a single unit. In general, parallel flow increases thermodynamic efficiency because both heat exchangers are exposed to ambient inlet air (rather than one being exposed to air heated in the other). However, this may require increased space and potentially cost. In one group of examples, a single fan may pass flow across both in parallel, thus eliminating a fan and its cost. In other implementations, there may be separate fans 70-1, 70-2, which could provide better control separate flows 520-1, 520-2.

Figure 5:
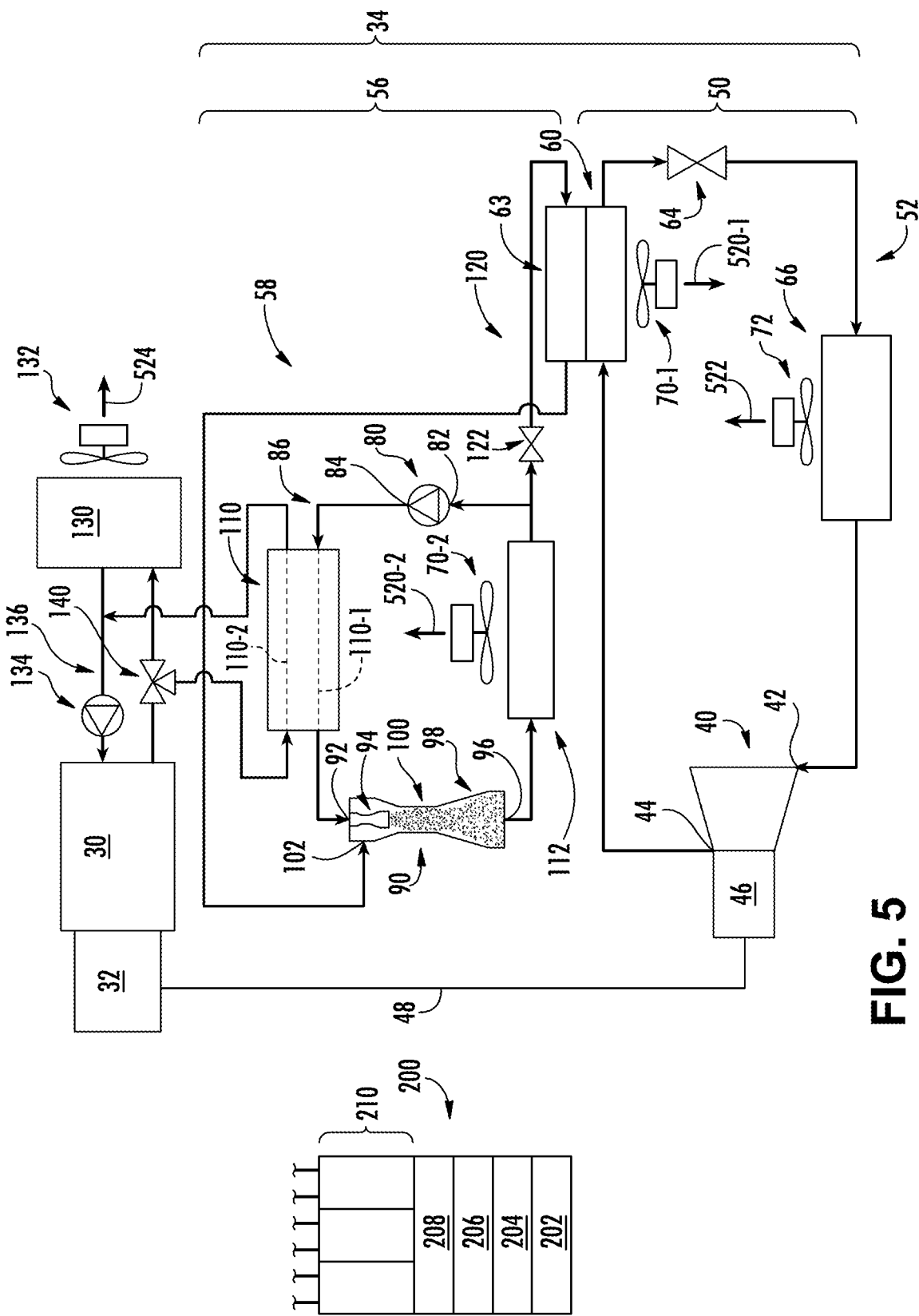
FIG. 5 is a schematic view of a fourth refrigeration system.

Yet further variations involve effectively eliminating the subcooler 62 and replacing it with an evaporator 63 in the heat recovery system (e.g., FIG. 5). The evaporator (heat rejection heat exchanger) may be placed in series with the heat exchanger 60 instead of placing the heat rejection heat exchanger 112 in series. In such implementations, the evaporator and the heat exchanger 60 may be the two sections of the integrated single unit. This would involve adding one net fan over the FIG. 1 embodiment with one fan 70-2 driving airflow 520-2 only across the heat exchanger 112 and another fan 70-1 driving airflow 520-1 in series across the added heat recovery system evaporator and the heat exchanger 60. An exemplary airflow direction places the added evaporator upstream to precool the air (which then flows across the heat exchanger 60) and thereby effectively provide interloop heat transfer from the vapor compression system to the heat recovery system.

Other possible integrations involve yet further integrating heat exchangers and/or combining air flowpaths. One example modifies the FIG. 5 configuration by eliminating the fan 70-2 and integrating the heat exchanger 112 with heat exchangers 60 and 63 as sections of the integrated single unit (e.g., 112 could be immediately downstream of 60 along the flowpath 520-1 of FIG. 5).

Figure 6:
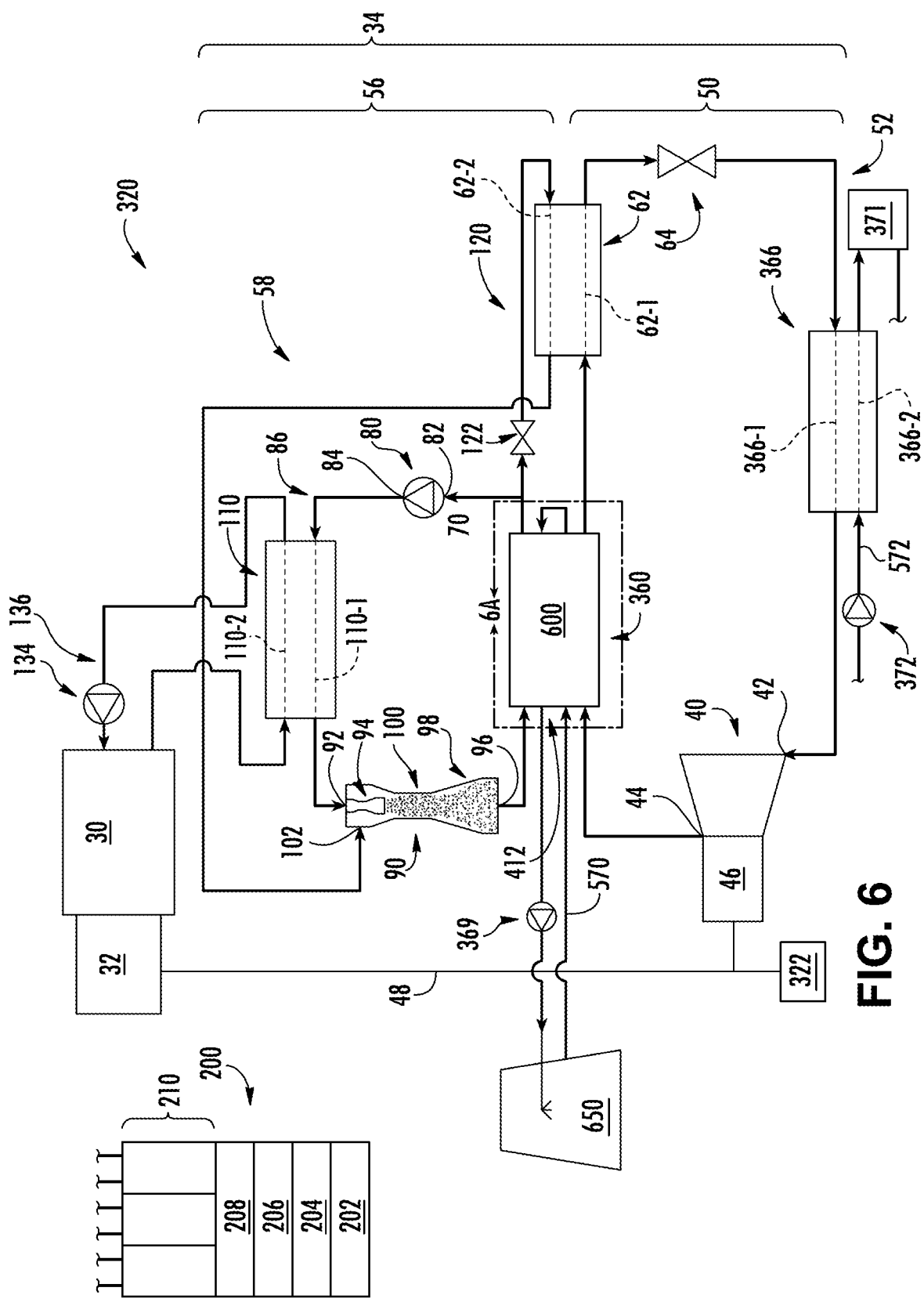
FIG. 6 is a schematic view of a combined cooling heating and power (CCHP) system.
Figure 6A:
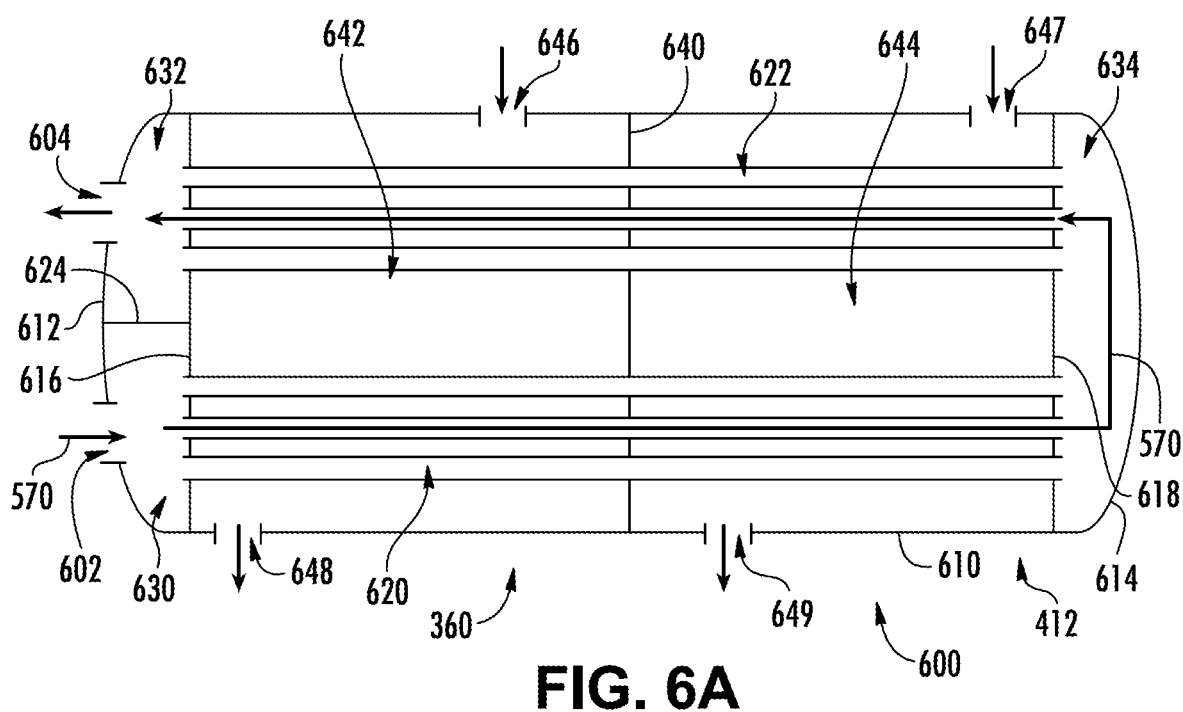
FIG. 6A is a view of a shell and tube condenser of the CCHP system of FIG. 6.

Further variations may involve stationary or fixed site installations. FIG. 6 shows an exemplary fixed site installation or system 320 embodied as a combined cooling, heating, and power (CCHP) system. Generally, like components to the system 20 are shown with like numerals even though the scale or form may ultimately be different in any particular implementation. The CCHP system 320 features refrigerant-water (generically including other liquids such as brine, glycols, other solutions, and the like)) heat exchangers in place of refrigerant-air heat exchangers. In addition to powering the compressor motor 46, the generator 32 powers additional electric loads 322 of a building (e.g., beyond the loads of the system itself and, more broadly beyond heating ventilation and air conditioning (HVAC) loads). The vapor compression system evaporator 366 (legs 366-1 and 366-2 in heat exchange relation) cools a water flow 572 along a water flowpath (e.g., including along leg 366-2 and pumped via a pump 372 along a water line/conduit to/from cooling loads 371 such as air handling units, building cold water and the like). Condenser sections 360 and 412 along the two loops may be respective sections of a single refrigerant-water heater exchanger 600 (FIG. 6A). One example is a shell and tube heat exchanger. Another example is a brazed plate heat exchanger. Yet another example is a tube-in-tube heat exchanger. FIG. 6 shows a water flow 570 along a water flowpath (e.g., pumped via a pump 369 along a water line/conduit) from/to a cooling tower 650 through the unit 600. The unit 600 has a water inlet 602 and a water outlet 604. The exemplary unit 600 is a shell and tube heat exchanger having a shell with a cylindrical wall 610 and end caps 612 and 614. Plates 616 and 618 define plena at respective end and are spanned by tube groups 620 and 622. The first end plenum formed by the plate 616 and end cap 612 is subdivided by a plate 624 into respective inlet and outlet plena 630 and 632. The second end plenum 634 defines a turn in the flowpath with the flowpath proceeding sequentially through the inlet 602 into the plenum 630, through the tubes 620 to the plenum 634, and then back through the tubes 622 to the plenum 632 and the outlet 604.

To cool the fluid of the two loops, the interior of the shell is further subdivided by a dividing plate 640 into chamber 642 and 644 which effectively form the condensers 360 and 412, respectively. The chamber 642 has an inlet 646 and an outlet 648. The chamber 644 has inlet 647 and an outlet 649. Refrigerant from the compressor passes into the inlet 646 where it rejects heat to the sections of the tubes 622 and 620 within the chamber 642 before passing out the outlet 648 to go to the subcooler. Similarly, heat recovery fluid from the ejector passes through the inlet 647 and rejects heat to the water flowing in sections of the tubes 622 and 620 within the chamber 644 before exiting the outlet 649.

In yet further variations, instead of being an engine, the heat source 30 may be a fuel cell.

Figure 7:
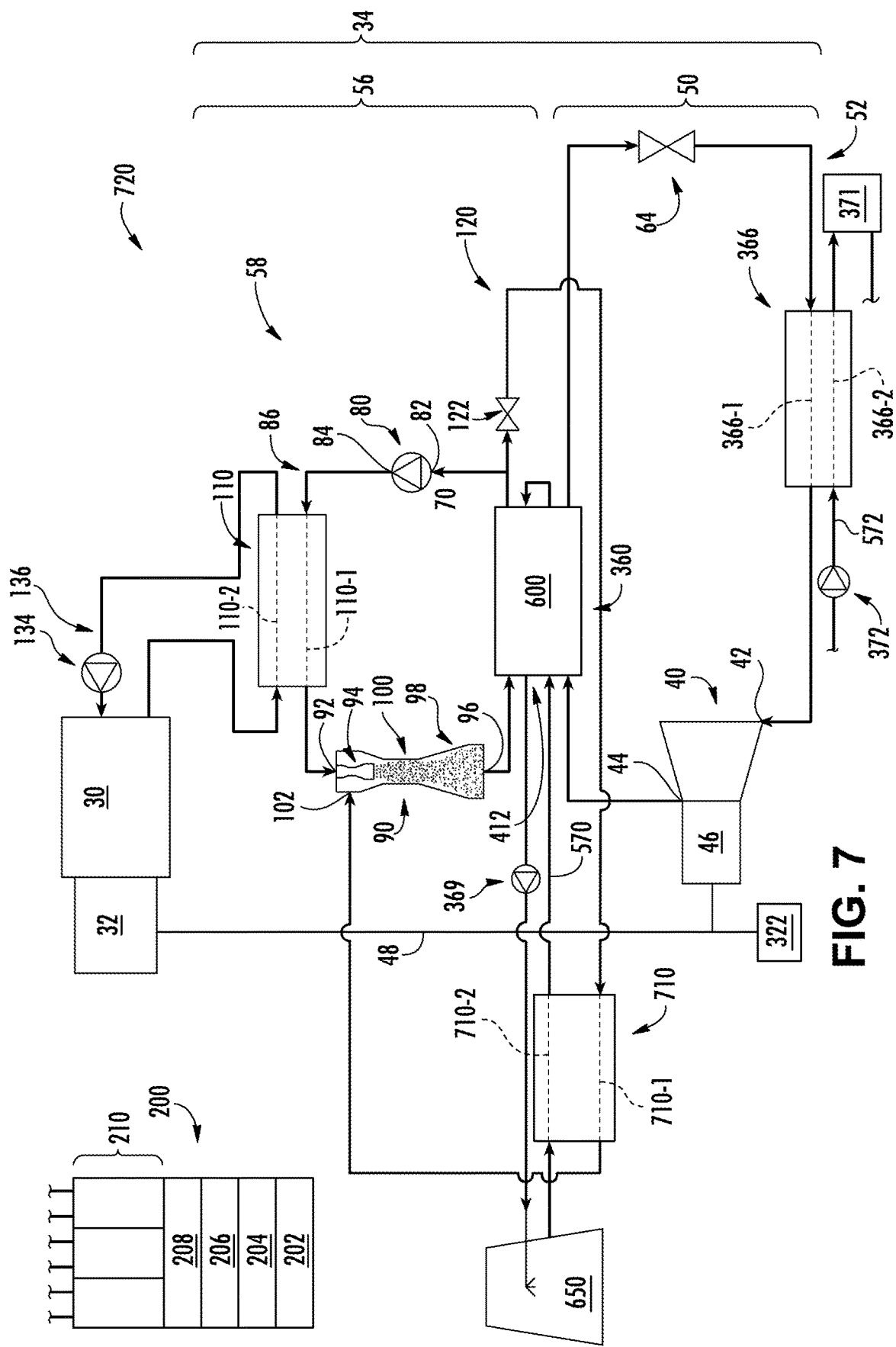
FIG. 7 is a schematic view of a second CCHP system.

Other variations may be along the lines noted above for the refrigerated transport system. For example, FIG. 7 shows a CCHP system 720 wherein the refrigerant-refrigerant subcooler is replaced with a refrigerant-water precooler 710 having a leg 710-2 along the cooling water flowpath rejecting heat to a leg 710-1 (acting as an evaporator) along the flowpath 58 upstream of the ejector suction port. This further cools the cooling water from the tower to further cool the refrigerant and heat recovery fluid in the unit 600 (in a fashion similar to the unillustrated modification of FIG. 5 integrating the condenser 112 into the unit with 60 and 63).

In a variation on the FIG. 7 system, rather than having a single integrated unit 600, there are physically separate WCC for the two loops, each with its own water supply and return from the tower. The precooler (leg 710-1 forming heat recovery loop evaporator) cools the water supply (along leg 710-2) for the vapor compression system's WCC. Thus, the precooler (leg 710-2) and the vapor compression system's WCC are in series along the heat transfer fluid flowpath (the cooling water flowpath for the vapor compression system's WCC).

Thus, it is seen that one or more of several further shared features may exist between the loops of the various systems. A first area involves the physical integration of the heat exchangers of the vapor compression loop and heat recovery loop. Another area which may exist simultaneously with or alternatively to the first is the shared heat transfer fluid (air or water (generically including other liquids such as brine, glycols, other solutions, and the like)) whether in series or otherwise (e.g., the split series configuration of FIG. 6).

Yet further variations on the foregoing systems involve the particular working fluids of the vapor compression system and heat recovery system. As mentioned above, they may be the same or different. In one possible area of differences, the refrigerant of the vapor compression system may be relatively non-flammable (and/or less toxic, and/or less harmful to the contents of the refrigerated compartment) when compared to the heat recovery fluid. For example, appropriate isolation allows only potential exposure/venting of the refrigerant into the box interior. The heat recovery fluid may be isolated from the box so as to not be able to accumulate in an enclosed space if there is a leak. Thus, one exemplary combination is a carbon dioxide-based refrigerant (e.g., R744) and a hydrocarbon heat transfer fluid (e.g., R290). An alternative pair is R452A/R245fa.

The physical configuration of the system is merely illustrative and may schematically represent any of a number of existing or yet-developed constructions. The inventive methods described below may also be applicable to other constructions.

The system may include various additional components including, receivers, filters, dryers, valves, sensors, and the like.

One or more embodiments of the present invention have been described. Nevertheless, it will be understood that various modifications may be made without departing from the spirit and scope of the invention. For example, when applied in the reengineering of baseline system configuration or the remanufacturing of a baseline system, details of the baseline may influence or dictate details of the particular implementation. Accordingly, other embodiments are within the scope of the following claims.

What is claimed is:

1. A refrigerated transport system comprising:
   a heat source;
   a vapor compression system comprising:
     a compressor for compressing a flow of a refrigerant;
     a first heat exchanger along a refrigerant flowpath of the refrigerant; and
     a second heat exchanger along the refrigerant flowpath of the refrigerant;
   a refrigerated compartment in thermal communication with the vapor compression system second heat exchanger; and a heat recovery system having:
  a first heat exchanger for transferring heat from the heat source to a heat recovery fluid along a heat recovery flowpath; and
  a second heat exchanger along the heat recovery flowpath,
wherein:
  the heat recovery system second heat exchanger and the vapor compression system first heat exchanger are respective portions of a shared heat exchanger for rejecting heat to a heat transfer fluid;
  a separate subcooler has respective legs along the vapor compression flowpath and the heat recovery flowpath; and
  the heat recovery system first heat exchanger has respective legs along a coolant flowpath of the heat source and the heat recovery flowpath.

2. The refrigerated transport system of claim 1, wherein:
the separate subcooler respective legs along the vapor compression flowpath and the heat recovery flowpath are in heat exchange relation with each other; and
the heat recovery system second heat exchanger is a condenser.

3. The refrigerated transport system of claim 1, wherein:
the refrigerated transport system has a box forming the refrigerated compartment.

4. The refrigerated transport system of claim 1, wherein the heat recovery system further comprises:
an ejector having a motive flow inlet, a secondary flow inlet, and an outlet;
a pump; and
a loop of the heat recovery flowpath passing through the pump to the heat recovery system first heat exchanger, through the motive flow inlet and from the outlet back to the pump via the heat recovery system second heat exchanger.

5. The refrigerated transport system of claim 1 further comprising:
a radiator; and
a valve along the coolant flowpath for apportioning a total coolant flow between the radiator and the heat recovery system first heat exchanger.

6. The refrigerated transport system of claim 1, wherein:
the heat recovery system second heat exchanger and the vapor compression system first heat exchanger are in common along a heat transfer fluid flowpath.

7. The refrigerated transport system of claim 1 wherein the refrigerated compartment is within a truck or a trailer.

8. The refrigerated transport system of claim 1 wherein said shared heat exchanger and is a tube/fin package.

9. The refrigerated transport system of claim 1, wherein:
the refrigerant and the heat recovery fluid are different from each other.

10. The refrigerated transport system of claim 9, wherein the refrigerant is less flammable and/or less toxic than the heat recovery fluid.

11. A method for operating the refrigerated transport system of claim 1, the method comprising, in a first mode:
running the compressor to compress the flow of refrigerant and drive the refrigerant along the refrigerant flowpath;
transferring the heat from the heat source to the heat recovery fluid along the heat recovery flowpath; and
rejecting heat from the refrigerant in the vapor compression system first heat exchanger.

12. The method of claim 11, further comprising, in the first mode:
driving air as said heat transfer fluid wherein along a heat transfer fluid flowpath the vapor compression system first heat exchanger is upstream of the heat recovery system second heat exchanger.

13. The method of claim 11, wherein, in the first mode:
heat is rejected by the heat recovery fluid in the heat recovery system second heat exchanger.

14. The method of claim 11, wherein:
the method further comprises, in the first mode:
  transferring heat from the refrigerant in the vapor compression system to the heat recovery fluid in the heat recovery system in the subcooler via a refrigerant-refrigerant heat exchange without airflow.

15. The method of claim 11, wherein the refrigerated transport system further comprises a radiator and the method further comprises, in the first mode:
using a valve to apportion coolant between the heat recovery system first heat exchanger and the radiator.

16. The method of claim 11, wherein:
the refrigerated compartment is within a truck or a trailer.

17. The method of claim 11, wherein:
the heat transfer fluid is air; and
the system has a fan for driving the air.

18. The method of claim 11, wherein:
the vapor compression system second heat exchanger is an evaporator in thermal communication with a load to cool the load in a cooling mode.

19. The method of claim 11, wherein:
the refrigerated transport system has a box forming the refrigerated compartment.

* * * * *